(12) United States Patent
Aluvala et al.

(10) Patent No.: US 10,579,411 B2
(45) Date of Patent: Mar. 3, 2020

(54) LOADING AND RUNNING VIRTUAL WORKING ENVIRONMENTS IN A MOBILE DEVICE MANAGEMENT SYSTEM

(71) Applicant: AIRWATCH, LLC, Atlanta, GA (US)

(72) Inventors: Suman Aluvala, Bangalore (IN); Arvind Maan, Bangalore (IN); Swarnadeep Banerjee, Bangalore (IN)

(73) Assignee: AIRWATCH, LLC, Atlanta, GA (US)

( * ) Notice: Subject to any disclaimer, the term of this patent is extended or adjusted under 35 U.S.C. 154(b) by 0 days.

(21) Appl. No.: 16/218,700

(22) Filed: Dec. 13, 2018

(65) Prior Publication Data

US 2019/0114199 A1  Apr. 18, 2019

Related U.S. Application Data

(63) Continuation of application No. 15/264,598, filed on Sep. 14, 2016, now Pat. No. 10,176,008.

(30) Foreign Application Priority Data

May 19, 2016 (IN) .............................. 201641017354

(51) Int. Cl.
*G06F 9/455* (2018.01)
*H04L 29/06* (2006.01)

(52) U.S. Cl.
CPC ...... *G06F 9/45558* (2013.01); *H04L 63/0853* (2013.01); *G06F 2009/45587* (2013.01); *G06F 2009/45595* (2013.01)

(58) Field of Classification Search
CPC . H04L 63/08; H04L 63/0807; H04L 63/0876; G06F 9/45558; G06F 2009/45587; G06F 2009/45595
See application file for complete search history.

(56) References Cited

U.S. PATENT DOCUMENTS

| | | | |
|---|---|---|---|
| 8,468,535 B1* | 6/2013 | Keagy | G06F 8/63 718/104 |
| 8,863,122 B2* | 10/2014 | Bouchier | G06F 9/4843 718/1 |
| 10,089,130 B2* | 10/2018 | Kim | G06F 9/45558 |
| 2007/0180450 A1* | 8/2007 | Croft | G06F 3/1415 718/1 |
| 2011/0225641 A1* | 9/2011 | Wu | H04L 63/08 726/9 |
| 2012/0089769 A1 | 4/2012 | Buswell | |

(Continued)

*Primary Examiner* — Khang Do
(74) *Attorney, Agent, or Firm* — Clayton, McKay & Bailey, PC (57) ABSTRACT

Systems herein allow a user to load a virtual work environment on a terminal, such workstation, based on authentication mechanisms built into a user device, such as a cell phone. The user device authenticate with a management server using an SAML token. The management server can track which virtual machines and configurations make up the user's work environment, and can send that information to the user device for loading the virtual machines. When the user wishes to load the virtual machines at a terminal, the user device can send the SAML token to the terminal for use in authenticating with the management server. The management server can then provide the configurations for the virtual machines that the user selects to load at the terminal.

20 Claims, 6 Drawing Sheets

(56) References Cited

U.S. PATENT DOCUMENTS

| | | | |
|---|---|---|---|
| 2013/0007737 A1 | 1/2013 | Oh | |
| 2014/0115587 A1* | 4/2014 | Qin | H04L 41/0672 |
| | | | 718/1 |
| 2014/0187162 A1* | 7/2014 | Mei | H04W 4/023 |
| | | | 455/41.2 |
| 2014/0189133 A1* | 7/2014 | Qin | H04L 63/08 |
| | | | 709/226 |
| 2014/0282062 A1* | 9/2014 | Kapoor | H04L 67/1097 |
| | | | 715/745 |
| 2015/0172760 A1 | 6/2015 | Abiezzi | |
| 2015/0195128 A1 | 7/2015 | Kim | |
| 2016/0085564 A1* | 3/2016 | Arcese | G06F 9/4451 |
| | | | 726/7 |
| 2016/0174272 A1* | 6/2016 | Rabii | H04W 8/005 |
| | | | 455/422.1 |
| 2016/0306651 A1* | 10/2016 | Kripalani | G06F 9/45533 |
| 2017/0063927 A1 | 3/2017 | Shultz | |

\* cited by examiner

LOADING AND RUNNING VIRTUAL WORKING ENVIRONMENTS IN A MOBILE DEVICE MANAGEMENT SYSTEM

RELATED APPLICATION

This patent application is a continuation of U.S. patent application Ser. No. 15/264,598 ("LOADING AND RUNNING VIRTUAL WORKING ENVIRONMENTS IN A MOBILE DEVICE MANAGEMENT SYSTEM"), filed Sep. 14, 2016, which claims the benefit of priority to India Application No. 201641017354, filed May 19, 2016. Both of these applications are incorporated by reference herein in their entireties.

BACKGROUND

Enterprises can use virtual machines ("VMs") to provide working environments to users, allowing users to access their working environments and work files from multiple different devices and locations. A virtual machine can be executed on or provided by a server, based on user credentials. Because the virtual machine is not tied to a single device, the user can access their work on a mobile device, such as a phone or laptop, or on a terminal, such as a workstation computer or a media player in a conference room. This flexibility promotes efficiency and collaboration among employees in the enterprise.

However, loading a virtual environment at multiple different devices can be cumbersome because multiple passwords are often involved. Usually, a user must first authenticate at the device where the virtual machine will be displayed. Then the user must authenticate at the virtual machine console by supplying a password. Separately authenticating at each workstation in this way can disrupt workflow. As a result, the user might opt to not use the workstation, ultimately decreasing productivity.

The user might also forget their passwords for various virtual machines if the passwords are complex. As a result, the user is likely to create simplified and easily remembered passwords, often using the same password at each virtual machine. Password simplicity and redundancy can be a security risk to the enterprise.

The user might also fee forced to load their entire virtual work environment in order to share aspects of their work at a terminal. This can also lead the employee to unintentionally expose confidential information. For example, in a meeting or other collaborative situation, the user's email might pop up and display on screen for all to read, even though the user is only trying to display edits to a document.

Loading the user's virtual machines at multiple devices can also be a drain on enterprise resources. For example, a virtual machine server can maintain multiple instances of virtual machines across multiple devices, even though the user is only using a single virtual machine on a single terminal at a particular time. This can needlessly use up processing bandwidth at the virtual machine server. Additionally, the virtual machine might be set up to print to a user's printer that is not near the terminal, instead of a nearby resource that sits idle, resulting in resource underutilization.

For at least these reasons, a need exists for mobile device management systems that load and run virtual working environments. More particularly, a need exists for systems that allow a user to load a virtual work environment on a terminal, such as a workstation, based on authentication mechanisms built into a user device.

SUMMARY

It is to be understood that both the foregoing general description and the following detailed description are exemplary and explanatory only and are not restrictive examples, as claimed.

An example system can allow a user to load their work environment at a terminal, using a user device. The terminal can be any type of compiling device, such as a workstation, personal computer, tablet, projector, display, media player, digital whiteboard, or printer. The user device can be a cell phone, laptop, tablet, or other portable device.

Using the built-in authentication in the user device, the user can load some or all of their work environment on the terminal. The user's work environment can utilize one or more applications hosted in virtual machines. These virtual machines can execute on a remote virtual machine server, which can be a cloud server. The terminal can be equipped with an application that displays graphics from the virtual machine. This can allow the user to flexibly work within an enterprise without carrying many different user devices, and can allow an enterprise to better utilize terminals and other resources.

The user can set up their virtual machines with specific configurations. The profile information and virtual machine information identifying the virtual machines and configurations are then stored at a management server. The user can then access the virtual machines based on receiving the profile and virtual machine information from the management server.

In one example, the user device authenticates at the management server using a Security Assertion Markup Language ("SAML") token sent from the user device to the management server. This can happen after user logs into the user device, such as by providing a fingerprint on a biometric reader on the user device. The management server can recognize the SAML token and send a profile and virtual machine information to the user device. The virtual machine information can identify at least one virtual machine associated with the user. The profile can specify a configuration for the virtual machine. Other types of single sign on tokens, such as OATH, can also be used in other examples. SAML tokens are used for convenience in this description, but are only one example.

The user device can then cause a virtual machine to display on a terminal with minimal further input from the user. In one example, the management components 112 of the terminal 120 and user device 110 communicate to cause the user device 110 to request authentication from the user. Based on biometric or other authentication at the user device, the user device can send the SAML token and the virtual machine information to the terminal. In turn, the terminal can authenticate at the management server by providing the SAML token. In response, the management server can send the profile to the terminal. In another example, no further authentication is required at the user device 110 before sending the SAML token to the terminal.

Using the virtual machine information and the configuration specified in the profile, the terminal can launch or wake a virtual machine at a virtual machine server. The virtual machine can run a guest application that is configured according to the profile. The terminal can display the virtual machine, either by receiving graphics information from the virtual machine server or by receiving a guest application or some portion of the virtual machine itself for execution at the terminal.

This can allow a user to load their work environment on multiple different terminals in the enterprise using the simplified and strong authentication built into the user's user device. This ease of authentication is also provided without sacrificing security or management capabilities within the system. Additionally, resource management can be improved. For example, when the user removes their user device from the reader at the terminal, the virtual machine can go into sleep mode, saving processing resources. When the user next accesses the virtual machine from the terminal, the user device, or another device, the work environment will be in the same state that the user left it.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems for managing virtual work environments with a mobile device management system. A work environment can include one or more virtual machines that execute fully or partially at a virtual machine server. A management server can track profiles that correspond to different users or enrolled user devices, such as cell phones, tablets, or laptops. A profile can include configurations for one or more virtual machines that can execute for display at the user device. The management server can also store virtual machine information, which can identify the virtual machines at the virtual machine server.

The user device can authenticate at the management server using a SAML token. To receive the SAML token, the user device can communicate with an identity management server, which can be part of, or separate from, the management server. The management server can associate the SAML token with a profile and virtual machine information during enrollment, in one example. When the user device authenticates with the management server using the SAML token, the respective profile and virtual machine information can be retrieved and sent to the user device. This allows the user device to run the virtual machines associated with the user's work environment.

The user can also use the user device to load one or more of the virtual machines at a separate terminal, such as a workstation or media player. Unlike prior systems, this can be done without the user needing to remember or input an additional password. Additionally, the user can select which virtual machine(s) to operate at the terminal. For example, the user device can communicate with the terminal, such as with a near field communication ("NFC") reader. A management component in the user device can detect the NFC reader and present a graphical user interface ("GUI") that allows the user to pick which virtual machine(s) to load at the terminal. The GUI can also present the status of those virtual machines, such as which ones are instantiated, active, or asleep. Alternatively, the user device can connect over a network to a remote terminal, and use the GUI to load the virtual machine for remote display at the terminal.

Upon selecting at least one virtual machine, the user device can send the SAML token and corresponding virtual machine information to the terminal. This transaction can be managed by management components on both the user device and terminal. Using the SAML token, the terminal can then authenticate with the management server and receive the user's profile for configuring the selected virtual machine. The terminal can then contact the virtual machine server using the virtual machine information. The identified virtual machine can execute according to the user's configuration, either at the virtual machine server, the terminal, or partially at both. The corresponding portion of the user's work environment can then be displayed at the terminal.

In this way, the user is able to load their work environment on a terminal using their authenticated user device. This can require minimal effort and simplify authentication by using mechanisms at the user device, such as fingerprint detection. Instead of requiring the user to submit passwords specific to the virtual machines, the rest of the credentials can be retrieved from the management server based on stored profiles, and supplied to the identified virtual machines by the management component. This simplifies authentication to the point where a user can simply carry their mobile device and start working from any managed terminal, such as a workstation, equipped with a management component. This can increase workforce productivity and save the enterprise money based on better resource utilization and reduced hardware upgrades and maintenance.

The system can also manage resources more efficiently than previous systems. For example, the management server can efficiently control instances of the virtual machines and better allocate physical resources. When the user device is removed from the NFC reader, the management component in the terminal can send a message that causes the virtual machine to go into sleep mode. When the user accesses the virtual machine at the terminal or another device at a later time, the virtual machine server can wake the virtual machine. Additionally, the management server can allocate physical resources to the user based on which resources are nearby and available. For example, the management server can make a nearby projector or printer available based on the user loading their virtual machine on a connected or associated terminal. The user's work environment can dynamically adapt to the location and terminal on which it is being used in the enterprise.

Figure 1:
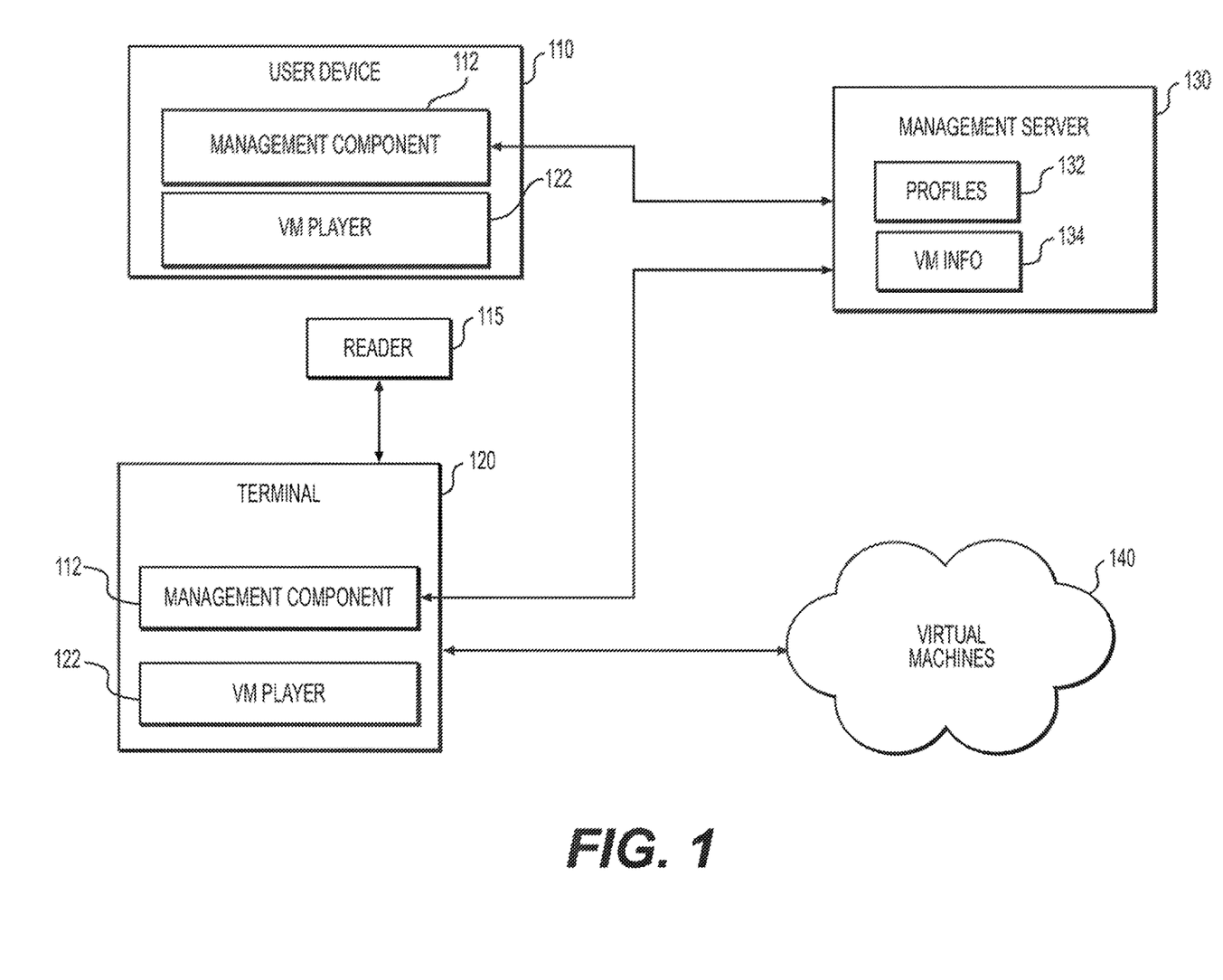
FIG. 1 is an exemplary illustration of system components.

FIG. 1 illustrates an exemplary system for managing virtual machines in a mobile device management system. A user device 110 can be any computing device, such as a cell phone, laptop, tablet, or personal computer. The user device 110 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. The user device 110 can be a personal user device that is owned by the user rather than an enterprise. The user device 110 can alternatively be a corporate or enterprise-owned device.

A management server 130 can manage the user device 110 and other enrolled user devices in a workplace or other enterprise environment. The user device 110 can complete an enrollment process with the management server 130. After a user device 110 has enrolled, the management server 130 can assign virtual machines 140 to the user device 110 for executing various managed applications that make up the user's work environment. The user can set up their virtual machines with specific configurations. The profile information and virtual machine information identifying the virtual machines and configurations are then stored at the management server. The managed applications can access enterprise information based on profiles 132 stored at the management server 130. To maintain security of enterprise information, the management server 130 can control aspects of the virtual machines 140 used to carry out enterprise activities. The management server 130 can also initiate installation of one or more managed applications on the user device 110.

The management server 130 can use stored profiles 132 to determine the permissions and configurations of each user device 110 within the enterprise environment. For example, the profiles 132 can specify which managed applications and virtual machines 140 the user device 110 can access and use. In one example, the profiles 132 control what functionality is available within those applications and virtual machines 140. The profiles 132 can also specify user credentials needed to authenticate the user when loading the virtual machines 140. The profiles 132 can also dictate which file repositories the user device 110 can access.

The specific profiles 132 assigned to a user device 110 can be based on user characteristics, geographical characteristics, and user device 110 characteristics. Some or all of this information can be collected during enrollment. For example, a profile 132 can specify a user group to which the user device 110 belongs. Example user groups can include software developers and executives. In one example, an administrator user can associate a user with a user group, and subsequent enrollment of the user device 110 can assign profiles 132 and managed applications to the user device 110 according to the user group. Different profiles 132 can also be assigned to a user device 110 at different times. For example, different profiles 132 can be assigned based on where the user is located, such as different office locations. These profiles 132 are stored at the management server 130 in an example.

The management server 130 can also store virtual machine information 134. The virtual machine information can identify the virtual machines 140 that are associated with the user. The virtual machine information 134 can include unique identifiers for the virtual machine(s) 140. The virtual machine information 134 can also identify the location of the virtual machine, such as a virtual machine server in the cloud. Using the virtual machine information 134, the user device 110 can contact the virtual machine server and identify a virtual machine on that server. Credentials required for communicating with the virtual machine server or loading the virtual machine can also be part of the virtual machine information 134. In one example, the virtual machine information 134 can be linked to the profile 132 or part of the profile 132.

In one example, the user can launch some or all of their work environment on a terminal 120 with minimal additional authentication. In some examples, no additional authentication is needed at all, and the user can simply select a virtual machine on the user device 110 to load at the terminal 120. The terminal 120 can be any type of computing device, such as a workstation, personal computer, tablet, projector, display, digital whiteboard, or printer. The terminal 120 can use the SAML token of the user device 110 to load one or more virtual machines 140 that are associated with the user.

To initiate this action, the user device 110 can connect to the terminal 120 by communicating with a reader 115 in an example. The reader 115 can be an NFC reader or other localized communication reader. For example, the user can place their user device 110, such as a cell phone, against the NFC reader. This can cause the management component 112 of the user device 110 to detect the terminal 120 and present a GUI for selection of virtual machines 149 to run at the terminal 120. The GUI can also present the status of the virtual machines 140 associated with the user. This can include indicating which virtual machines 140 are instantiated, active, or asleep.

Alternatively, the user device 110 can connect over a network to a remote terminal 120. As an example, a VM player or other managed application can display a GUI for selecting a terminals 120 on the enterprise network. Terminals 120 having a management component 112 installed can identify themselves at the management server 130. The management server 130 can provide a list of available terminals 120 to the user device 110. The user can select the terminal 120 from the list. Then, the management component 112 of the user device 110 can communicate with the management component 112 of the terminal 120 to send the SAML token to the terminal 120 over the network. Then, the terminal 120 can authenticate with the management server 130, and remotely display a virtual machine.

In another example, the management server 130 can track which resources, such as a printer or display device, are available to a terminal 120. When a user loads a virtual machine 140 at the terminal, the management server 130 can assign the resources to the virtual machine 140. This can provide the user with convenient resources wherever their work environment is loaded. For example, a user would not need to reconfigure their work environment to print to a nearby printer because the management server 130 can automatically assign the printer to the user based on their current work location.

The management server 130 can interact with managed applications, such as the VM player 122 on the user device 110 or terminal 120, through use of a management component 112 that executes on the user device 110 and terminal 120. The management component 112 can be installed during enrollment with the management server 130. The management component 112 can include a device-level component, such as an API, agent application, hypervisor, or virtualized device, and an application-level component, such as an API, software development kit ("SDK"), application wrapper, or workspace agent application. The device-level management component 112 can include system-level privileges. The application-level management component 112 can include privileges in managed applications, which can be developed for operation with the management server 130. Reference to the management component 112 is understood to include either or both of the device-level and application-level management components 112 unless otherwise specified.

The management server 130 can interact with the management component 112 with calls to an application (i.e., application level) or the operating system (i.e., device level) of a user device 110. In one example, based on a profile 132, the management server 130 can turn functionality on and off within the managed applications(s) through calling subroutines in the management component 112. If the profile 132 specifies it, the management server 130 can turn off functionality at the user device 110 or virtual machine 140, such as priming, emailing, or Internet access. This can allow for added security when viewing, editing, or conversing about particularly sensitive documents that are displayed in the VM player 122 or other application.

The VM player 122 can execute on the user device 110 or terminal 120 for displaying virtual machine 140 content. The VM player 122 can receive virtual machine content from a virtual machine 140. The content can include graphics frames for display in the VM player 122. In this way, the virtual machine 140 can execute remotely from the user device 110 and supply graphics frames as they are generated on a virtual machine server. This can allow the virtual machines 140 to be platform agnostic with regard to the user device 110 or terminal 120. For example, a virtual machine 140 might execute in the cloud on a Linux server while the user device 110 is running a different operating system. So long as the VM viewer 122 can recognize the format of graphics frames from the virtual machine 140, it need not be able to execute the same operating system running the virtual machine 140.

In one example, the VM player 122 is a thin client. The virtual machine 140 can send graphics information from a frame buffer to the VM player 122 for display. Sending the graphics information can include sending frames of pixels in one example. The frame buffer can buffer multiple frames of pixels per second in one example. Each frame can be a snapshot of pixels at an instant in time. A higher frequency frame buffer can provide smoother animation when the frames are displayed at the VM player 122, but can require greater network bandwidth. In another example, the graphics information in the frame buffer can include vector information for recreating graphics at the VM player 122.

The frames in the frame buffer can be sized to match a window or screen size of the VM player 122 executing on the user device 110 or terminal 120. In another example, the frame size is a fixed size that is set to fill the screen of the user device 110 or terminal 120. Information regarding the frame 110 or terminal 120 can be maintained at the management server 130. In still another example, the frame size can be changed based on user interface ("UI") action events generated at the VM player 122 when the user resizes the VM player 122 window.

In one example, the VM player 122 opens a socket for lending graphics information from the virtual machine 140 to the user device 110, and for sending UI events from the VM player 122 to the virtual machine 140. The management server 130 can provide credentials for the VM player 122 to communicate with the virtual machine 140 based on the profile 132 or virtual machine information 134. As frames are sent to the VM player 122 and receipt verification is received, the virtual machine 140 can remove those frames from the frame buffer while adding additional frames to the frame buffer in substantially real time.

As the VM player 122 displays the graphics information locally at the user device 110 or terminal 120, the VM player 122 can listen for UI events. UI events can include mouse movements, typing, clicking, touch screen events, or any user input within the VM player 122. Capturing UI events can include tracking a UI event type. Additionally, in one example the player 122 capture timing information and location information, such as coordinates, related to the UI event. The VM player 122 can send information associated with the UI events to the virtual machine 140, which in turn can perform corresponding events. Sending information associated with a UI event can include sending an event type, such as a click, and a location.

In another example, the VM player 122 can be more than a thin client. For example, the VM player 122 can be responsible for executing some or all of the virtual machine 140. The virtual machine server or management server 130 can send a portion of the virtual machine 140, or an application for execution on the user device 110. This can be useful, for example, when network bandwidth cannot support sending graphics frames from the virtual machine 140 at a high enough frame rate for effective use of the virtual machine 140.

Figure 2A:
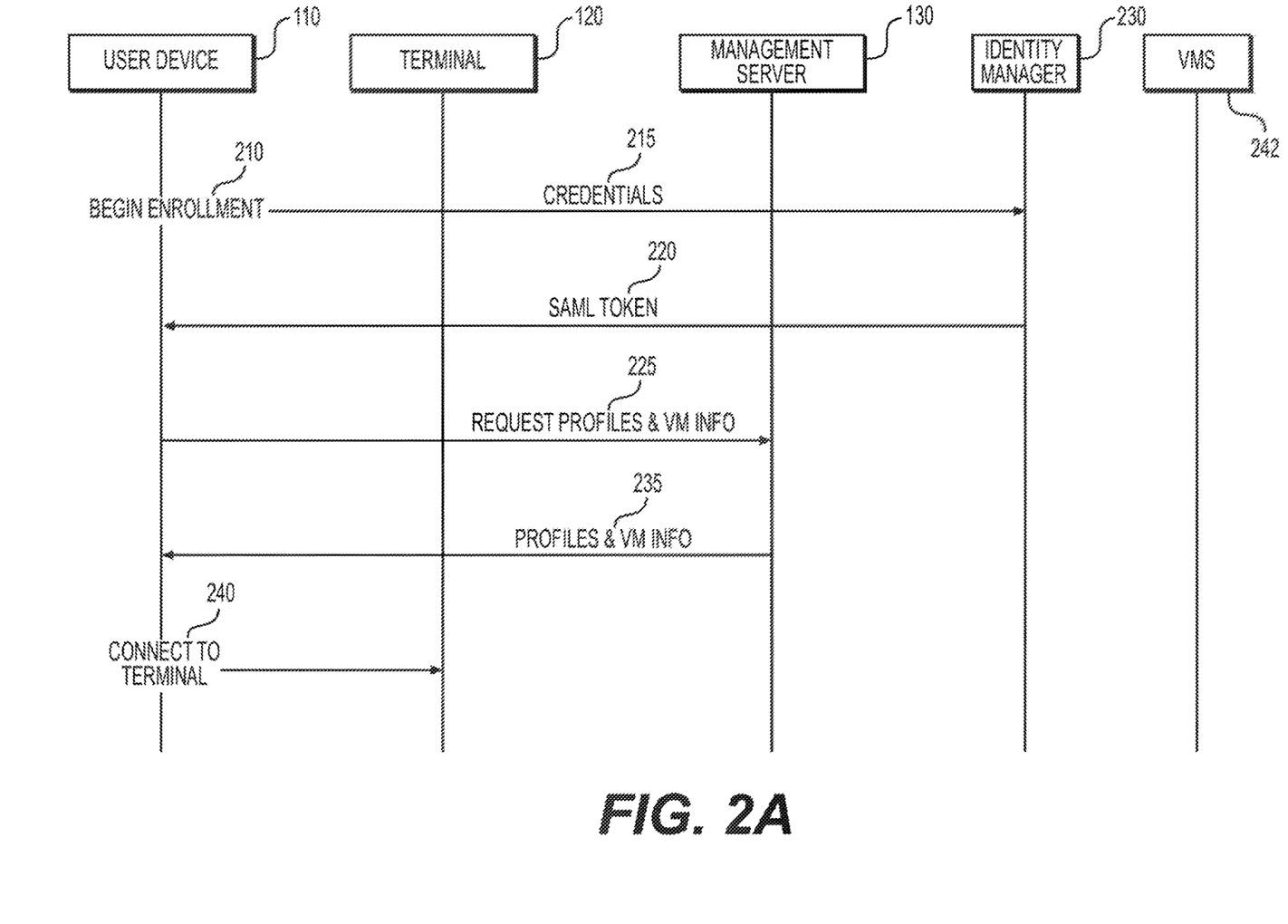
FIG. 2A is an exemplary method executed in a system.

FIG. 2A is an exemplary illustration of stages performed in authenticating a user device 110 in a mobile device management system. At stage 210, the user device 110 can begin an enrollment process. In one example, when the user logs into their user device 110, such as with a password or fingerprint identification, the management component 112 causes the user device 110 to retrieve a SAML token. This can include sending credentials at stage 215 from the user device 110 to an identity manager server 230 responsible for assigning SAML tokens to user devices. The identity manager server 230 can be separate from the management server 130 in one example. In another example, they are part of the same server.

At stage 220, the identity manager server 230 can send the SAML token 220 to the user device 110. This SAML token can be used to authenticate the user device 110 at the management server 130. The management server 130 associates the SAML token with the user device 110 for authenticating future requests from the user device 110.

At stage 225, the user device 110 can send the SAML token to the management server 130 as part of a request for a profile 132 and virtual machine information 134. The user device 110 can do this when the user selects an icon to run a managed application, which can be presented as a guest application within a virtual machine 140. When the management server 130 receives the SAML token, it authenticates the user device 110 and identifies the profile 132 and virtual machine information 134 associated with the user. At stage 235, the management server sends the profile 132 and virtual machine information 134 to the user device 110.

After authentication at the management server 130, the user device 110 can display one or more virtual machines 140 identified in the virtual machine information 134. To do so, the user device 110 can contact the virtual machine server, which can be a cloud server or part of the management server 130, to execute the identified virtual machines 140.

At stage 240, the user device 110 can initiate loading a virtual machine 140 at a terminal 120. This can allow the user to use their work environment at the terminal 120. Example stages for loading a virtual machine 140 for display at the terminal 120 are presented in FIG. 2B.

Figure 2B:
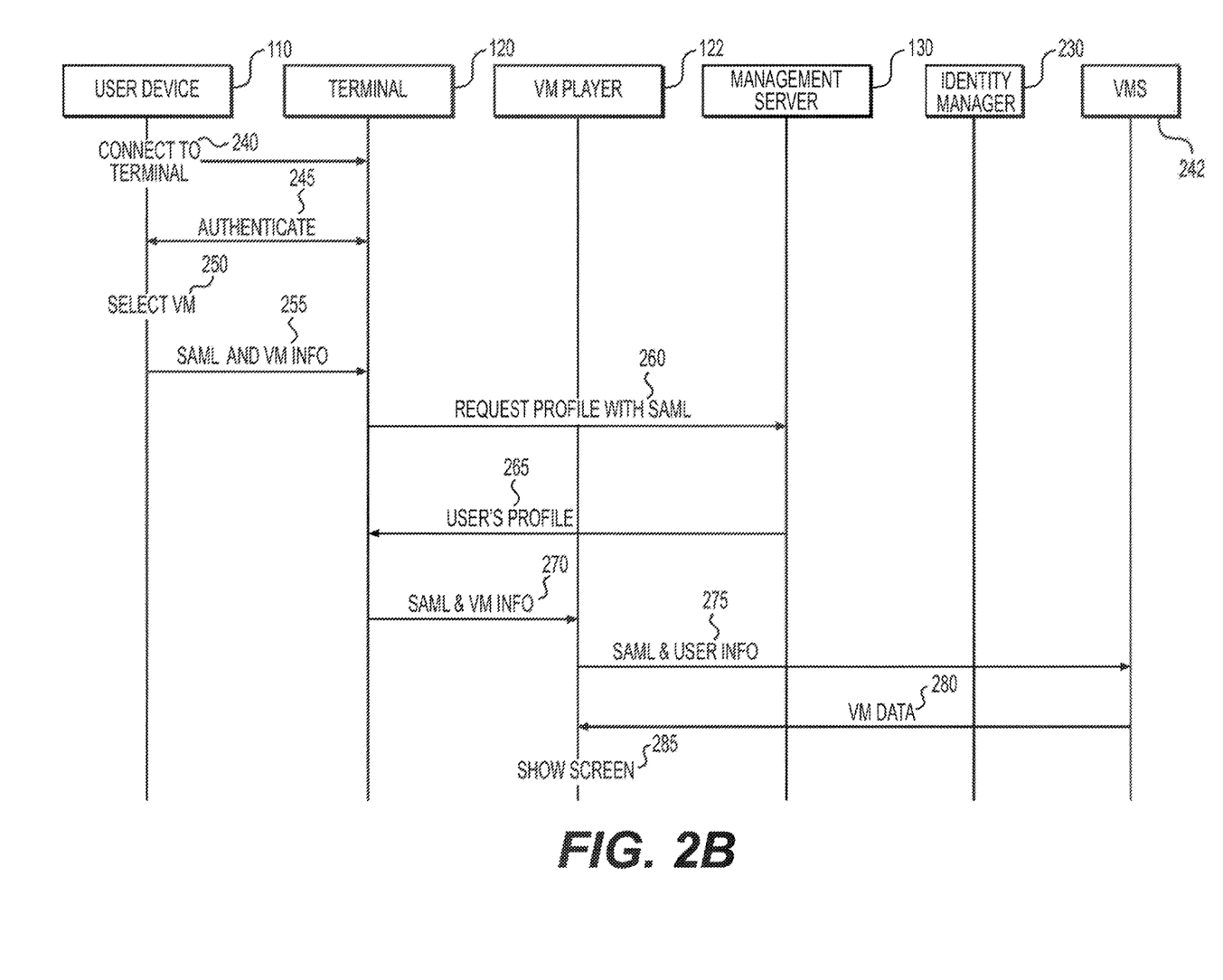
FIG. 2B is an exemplary method executed in a system.

Turning to FIG. 2B, at stage 240, the user device 110 can connect a terminal 120. The terminal 120 can execute a management component 112 that detects the user device 110 contacting terminal 120. In one example, this occurs when the user places the user device 110 on or near a reader 115 associated with the terminal 120. In one example, a user device 110 can pair with a terminal 120 through use of a near-field transmission, such as BLUETOOTH. Alternatively, the user can select a remote terminal 120 on the user device 110 to connect to over a network, such as an enterprise network or the Internet.

The terminal 120 can request the user credentials for use in authenticating with the management server 130. In response, at stage 245, the user device 110 can authenticate the user. In one example, the user need only authenticate locally on the user device 110. For example, the user device 110 can prompt the user to place a finger on a biometric scanner on the user device 110. Alternatively, the user can enter a password on the user device 110 that is used to unlock the user device 110.

Upon successful local authentication, at stage 250, the user device 110 can present a GUI for selecting the virtual machines 140 to load at the terminal 120. As will be discussed with regard to FIG. 3, the GUI can list the virtual machines 140 currently associated with the user. These virtual machines 140 are identified in disc victual tuachine information 134 received from the management server 130 in an example. The GUI can also list the status of the virtual machines 140, so that the user can determine which machines are currently running and which are asleep. The user can select one or more of the virtual machines 140 for loading at the terminal 120.

After one or more virtual machines 140 are selected, at stage 255 the user device 110 can send the SAML token and the virtual machine information 134 corresponding to the selected virtual machines 140 to the terminal 120. The virtual machine information 134 sent to the terminal 120 can be a subset of the total virtual machine information 134 at the user device 110, based on which virtual machines 140 the user selects to load at the terminal 120. If the user selects only one virtual machine 140, then the user device 110 sends the virtual machine information 134 that corresponds to that selected virtual machine 140.

In one example, the user device 110 sends virtual machine information 134 to the terminal 120. For example, the user device 110 can send virtual machine identifiers to the terminal 120 that allow the terminal 120 to request access to the complete virtual machine information 134 for the identified virtual machines 140. This can allow the management server 130 to control which virtual machines 140 can be accessed at the terminal 120. Some virtual machines 140 or configurations might be restricted from use at particular terminals 120. For example, a terminal 120 in a company lobby could be restricted from launching a virtual machine 140 that runs a content viewing application with access to high security documents. The virtual machine information 134 can identify a subset of virtual machines available to the user in one example.

At stage 260, the terminal 120 can then request the user's profile 132 by authenticating at the management server 130 using the SAML token. The management server 130 can validate the user based on the SAML token and locate the corresponding profile(s) 132. In one example, if the terminal 120 identifies selected virtual machines 140, the management server 130 can determine whether the terminal 120 has the security and technical attributes needed to launch the identified virtual machines 140. The management server 130 can further validate that the identified virtual machines 140 are associated with the user.

In one alternative example, the user does not select which virtual machines 140 to run at stage 250. As a result, the management server 130 can determine what virtual machine information 134 to provide to the terminal 120. For example, at stage 250, instead of presenting a list of available virtual machines 140 at the user device 110, the GUI can just allow the user to authorize running their entire work environment at the terminal 120. The management server 130 can then provide all of the virtual machine information 134 to the terminal 120 needed to execute the work environment.

In one example, the management server 130 can control which virtual machines 140 to make available at the terminal 120. Because the terminal 120 is also enrolled the management server 130, the available virtual machines 140 can be determined in part by device characteristics of the terminal 120. For example, if the terminal 120 does not have the needed software configuration (such as VM player 122) for a first virtual machine 140 but does have the needed software configuration for a second virtual machine 140, the management server 130 can send virtual machine information 134 for the second virtual machine 140 but not the first.

At stage 265, the management server 130 can send the profile(s) 132 to the terminal 120 for use in configuring the virtual machine(s) 140. The terminal 120 can then implement the user's settings, files, and other configurations using the virtual machines 140 is a consistent experience between the terminal 120 and the user device 110. The management server 130 can send some or all of the profiles 132 associated with the user to the terminal 120. In one example, the profiles 132 sent to the terminal 120 are based on which virtual machines 140 the terminal 120 will load. In one example, the profiles 132 can configure the user's desktop at the terminal 120.

Additionally, at stage 265, the management server 130 can provide the complete virtual machine information 134 for the identified virtual machines 140 if the user device 110 did not already do at stage 255.

At stage 270, the terminal 120 can launch a VM player 122 for viewing the selected virtual machines 140. This can include providing the VM player 122 with access to the SAML token, configuration information from the profile 132, and the virtual machine information 134.

The VM player 122 can then launch the virtual machine 140 at stage 275. This can include contacting a virtual machine server 242, which can be cloud-based, using the virtual machine information 134. In one example, the virtual machine server can instantiate the virtual machine 140. Is another example, the virtual machine 140 can be woken up from a sleep mode.

The virtual machine 140 can host a guest application that is configured based on the profile 132. For example, the profile 132 can specify what functionality is available within the guest application, such as which file repositories the guest application can access. The profile 132 can also set the guest application to reflect user preferences. For example, default repositories for storing a file can be adjusted. Recent document and bookmark lists can be populated. By supplying this sort of user information, the profile 132 can allow the guest application to present a consistent work environment each time the user uses the virtual machine 140.

In one example, the VM player 122 uses the SAML token to authenticate with the virtual machine. After authentication, the virtual machine sends virtual machine data, such as graphics, to the VM player 122. This can allow the virtual machine 140 to send the virtual machine data to the correct device between the user device 110 and the terminal 120.

At stage 280, the virtual machine server 242 can send the virtual machine data to the VM player 122. This allows the VM player 122 to display the virtual machine 140 at stage 285. The virtual machine data can be the complete virtual machine 140 in one example. The virtual machine 140 can be loaded by the VM player 122 or other application and executed on the terminal 120. Alternatively, the virtual machine data can include an application for executing locally and graphics information. As yet another alternative, the virtual machine data can include graphics information, such as pixels, vectors, or frames.

As explained with regard to FIG. 1, the virtual machine 140 can buffer graphics information and send the frames to the VM player 122 for display. This can provide security advantages by limiting the code and credentials that must reside on the terminal 120 or user device 110.

Figure 3:
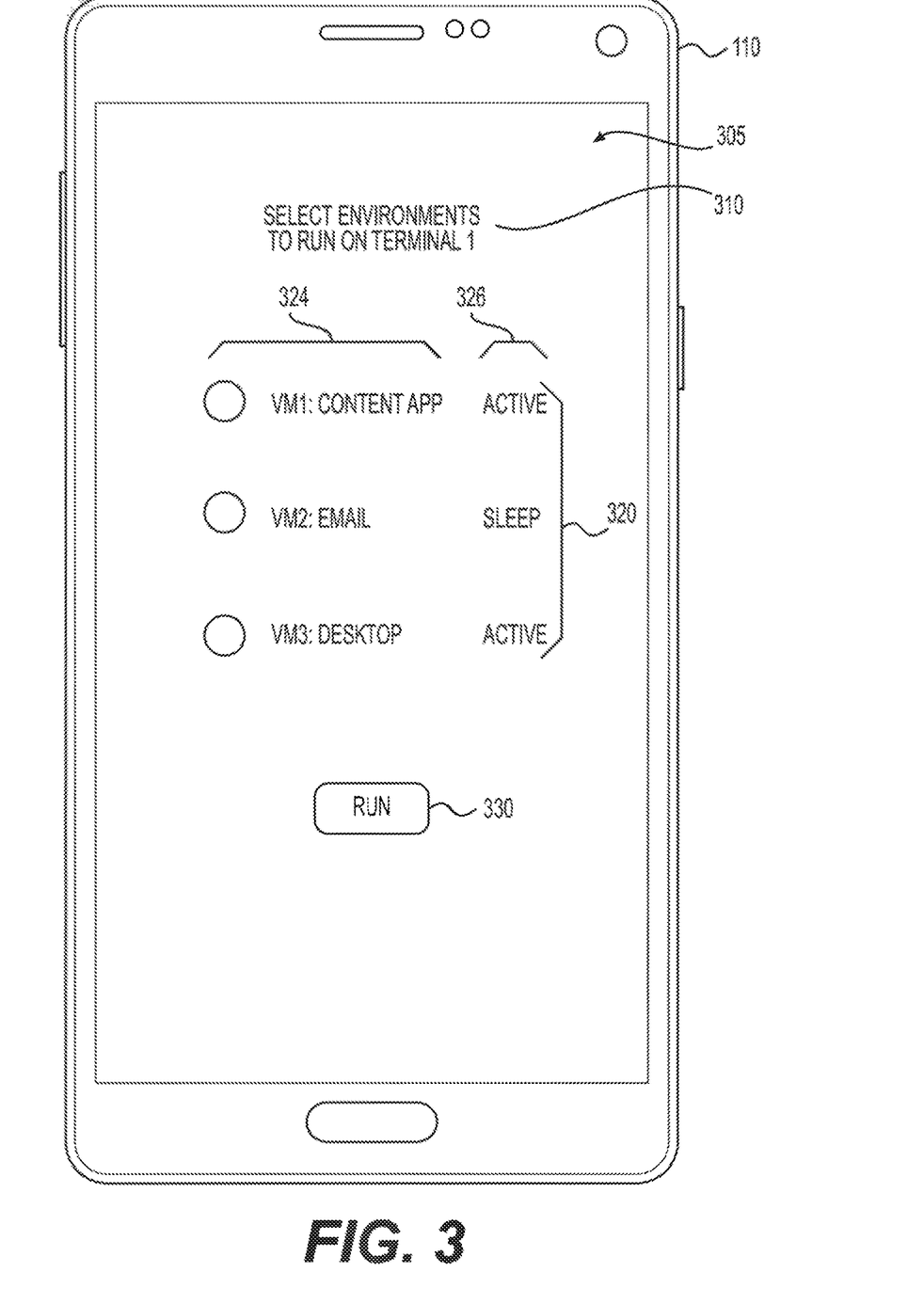
FIG. 3 is an exemplary illustration of a user's interface on a user device.

FIG. 3 includes an example illustration of a user device 110 displaying a GUI 305. The GUI 305 can be displayed by VM player 122 or management component 112, such as in conjunction with stage 250 of FIG. 2B. In one example, the GUI 305 is automatically displayed when the management component 112 of the user device 110 detects the presence of an NFC reader 115 associated with a managed terminal 120. The NFC reader 115 can broadcast a signal with a credential that is recognized by the management component 112 of the user device 110. The management user device 110 to prompt the user or automatically display the GUI 305.

The GUI 305 can identify the terminal 120 that will load the user's virtual machine 140. In this example, a message 310 on the GUI 305 indicates that "Terminal 1" will be loaded with a virtual machine 140.

In another example, the user can select a terminal 120 for displaying the work environment. The user device 110 can request available terminals 120 from fee management server 130. The management server 130 can determine which terminals 120 are available based on reporting by the management components 112 of those terminals 120. The management server 130 can provide a list of available terminals 120 to the user device 110 for selection. The list can be organized based on proximity to the user device 110. Proximity can be determined based on a predefined reader 115 location or based on beacon technology that locates the user device 110 within a building, among other methods.

This can allow, for example, the user to select a nearby smart monitor in as open conference room for displaying a part of their work environment. The user need not carry a laptop into the conference room, and instead can load their work environment from their phone.

Continuing with the example of FIG. 3, the GUI 305 can display a list 320 of virtual machines 140 associated with the user. The list 320 can identify virtual machines 324 and a status 326 for each of the virtual machines 324.

The status 326 indicators can provide the user with insight into the current management of available virtual machines 324. An "active" status 326 can indicate that a virtual machine 324 is currently in use. In one example, the GUI 305 can identify a particular device that is using the active virtual machine 324. This can allow a user to ensure that their working environment is not left running somewhere unintended. In another example, if the user removes their user device 110 from the reader 115, then the management component 112 of the terminal 120 or user device 110 sends a message to the virtual machine server 242 to put the virtual machine 324 to sleep. The management component 112 can also delete the SAML token from the terminal 120 in one example. If the user wishes to wake the virtual machine 324 and continue working from that terminal 120 or any other terminal 120, the user device 110 can resend the SAML token and authenticate as described with regard to FIG. 2B.

A "sleep" status 326 can indicate that the virtual machine 324 is not currently active. But the confutation can remain in memory at the virtual machine server 242 so that the user can quickly wake the virtual machine 324 and resume working from where they last stopped. This can allow the user to work at one workstation and then seamlessly transition to another workstation. For example, documents opened and edited in a conference room can remain with the sleeping virtual machine 324. When the user gets back to their desk, a second terminal 120, such as a second workstation, can wake the virtual machine 324 based on the stages described to FIG. 2B. The virtual machine 324 can wake with the environment as the user left it in the conference room.

An "inactive" status 326 can indicate that the virtual machine 324 is not currently instantiated. This could be the case when a user 110 has not loaded a virtual machine 324 since closing a guest application that is hosted by the virtual machine 324. The virtual machine server can instantiate the virtual machine 324 if the user selects to load it at the terminal 120 or elsewhere.

As illustrated in FIG. 3, the virtual machines 324 can be selected with radio buttons or other selection mechanisms. After the user has picked one or more of the virtual machines 324, the user can select a button 330 to load the virtual machines 324 at the terminal 120. The button can cause stage 255 to execute, sending the SAML token to the terminal 120 and providing identification of the selected virtual machines 324.

Figure 4:
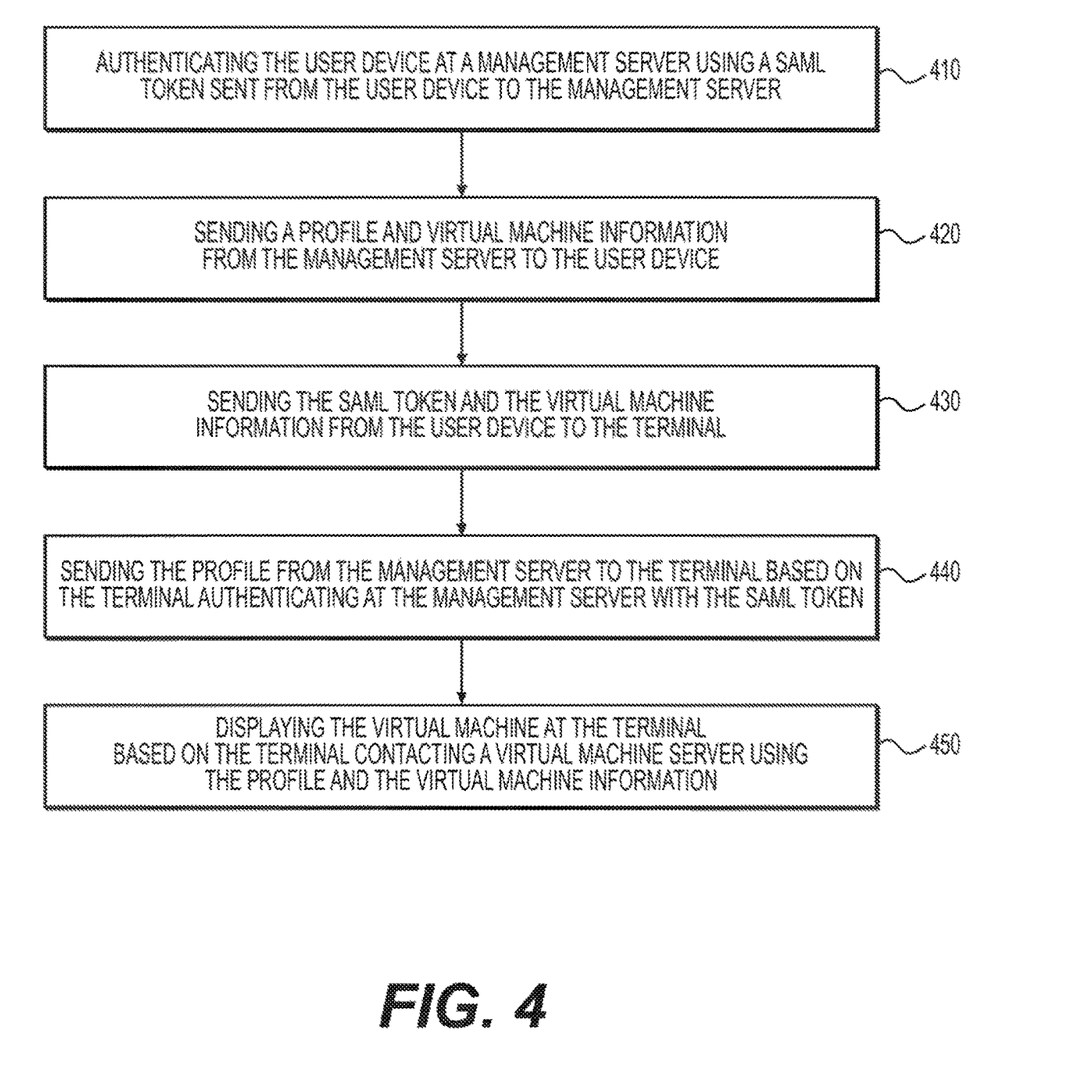
FIG. 4 is an exemplary method executed in a system.

FIG. 4 includes example stages performed in a system. The stages can be specified by instructions that are stored on one more storage mediums for execution by an enrolled user device 110, terminal 120, and management server 130.

At stage 410, the user device 110 can authenticate at the management server 130 using a SAML token. This can be done as part of an enrollment process. As a result of enrollment, the management component 112 and icons for launching the work environment can be installed on the user device 110. The icons can cause the user device 110 to launch a remote virtual machine 140 in one example. The virtual machine 140 can be controlled from within the VM player 122, which also can be installed from the management server 130 during or after enrollment.

At stage 420, the management server 130 can send the profile 132 and virtual machine information 134 to the user device 110. This can occur after enrollment to ensure that the user's virtual work environment is configured correctly. This can include configuring a virtual desktop of setting functionality within guest applications hosted by virtual machines 140.

At stage 430, the user device 110 can begin loading one or more virtual machines 140 on a terminal 120 by sending the SAML token to the terminal 120. The user device 110 can also identify which virtual machines 140 to load by sending virtual machine information 134 to the terminal 120. This need not be all of the virtual machine information 134 received at the user device 110. Instead, a subset of the virtual machine information 134 can be sent in one example, corresponding to the selected virtual machines 140.

At stage 440, the terminal 120 can contact the management server 130 and provide a SAML token. Using the SAML token, the management server 130 can identify the user or the user device 110. This allows the terminal 120 to authenticate with tire management server 130 and receive the profile 132 corresponding to the user from tire management server 130. The profile 132 can configure the selected virtual machines 140 as previously specified by the user or an administrator. In one example, the management server 130 also sends additional virtual machine information 134 so the terminal can communicate with the virtual machine server 242 aid fully identify and authenticate with the virtual machine 140. The virtual machine information 134 can identify the virtual machine 140, while the profile 132 can specify a configuration for the virtual machine 140. The configuration can include identifying the user based on user information. This can cause the virtual machine 140 to display the user's identity, or use or display favorites and recent files of the user. It can also cause the virtual machine 140 to arrange a menu or task bar in accordance with a configuration previously saved by the user.

At stage 450, the terminal 120 can display the virtual machine 140, such as with a VM player 122. The Virtual machine 140 can be displayed using the profile 132 configuration. Additionally, the terminal 120 can contact the virtual machine 140 using the virtual machine information 134. In this way, the terminal 120 can display the virtual machine 140 based on the terminal contacting a virtual machine server 242 using the profile 132 and the virtual machine information 134.

Figure 5:
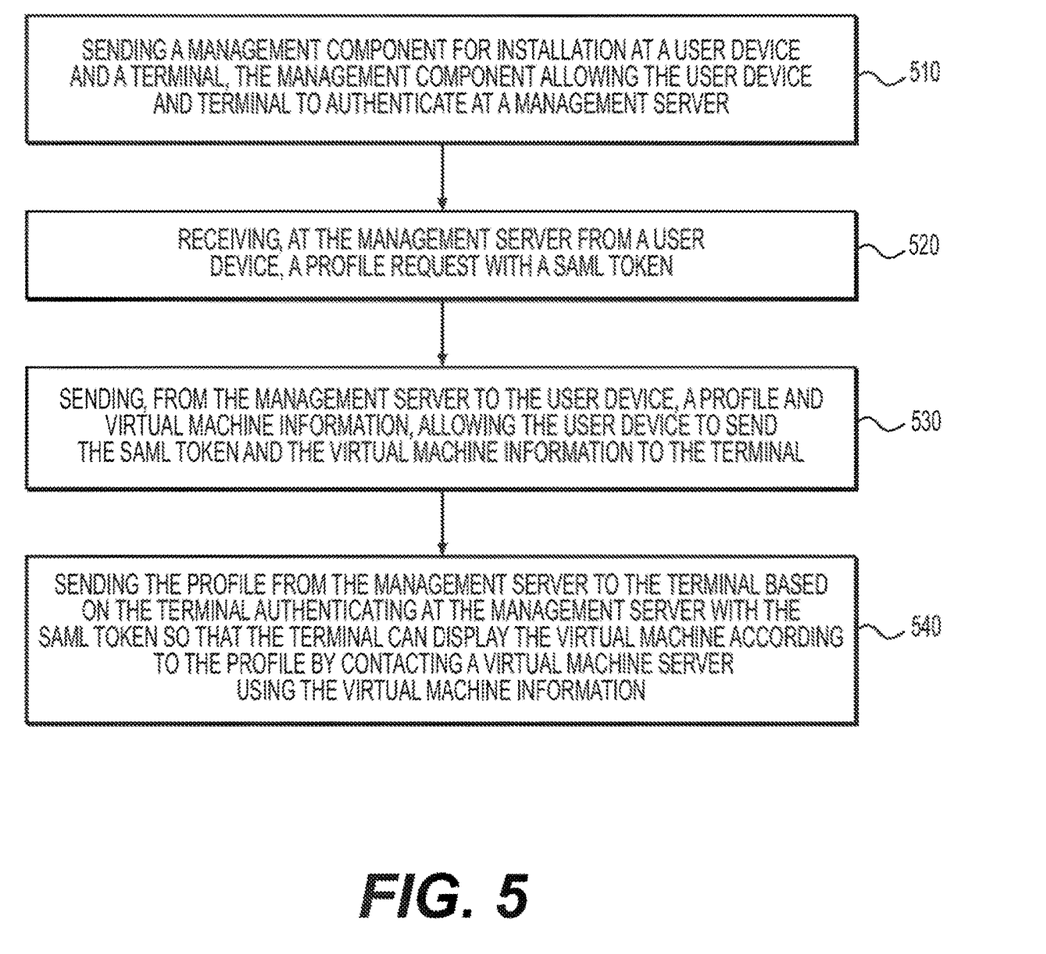
FIG. 5 is an exemplary method executed in a system.

FIG. 5 includes example stages performed in a management server 130. At stage 510, the management server 130 can send a management component 112 to a user device 110 for installation. This can occur during or alter enrollment. The management component 112 can facilitate communications between the user device 110 and a managed terminal 120.

At stage 520, the management server 130 can receive a request for a profile 132 from the user device 110. The profile 132 can be requested based on a SAML token that authenticates the user device 110 at the management server 130.

At stage 530, the management server 130 can send the profile 132 and virtual machine information 134 to the user device 110. This can allow the user device 110 to load the users work environment at a terminal 120. To do so, the user device 110 can send the virtual machine information 134 and the SAML token to the terminal 120. The virtual machine information 134 can be chosen by the management component 112 based on which virtual machines 140 the user selects to load at the terminal 120. Then, the terminal 120 can authenticate with the management server 130 by sending the SAML token to the management server 130.

At stage 540, the management server 130 can send the profile 132 to the terminal 120 based on the authentication with the SAML token. This can allow the terminal 120 to display the virtual machine according to the profile 132. The terminal 120 can contact the virtual machine server 242 using the virtual machine information 134, and receive virtual machine data for display at the terminal. The configuration information of the profile 132 can fee used by the virtual machine 140 to configure the guest application to reflect the functionality and preferences of the user's work environment. The virtual machine data can be graphics information, and a VM player 122 can displays the graphics at the terminal 120.

Other examples of the disclosure will be apparent to those skilled in the art from consideration of the specification and practice of the examples disclosed herein. For example, the term "document" is not restrictive and encompasses every type of electronic file. The term "terminal" can refer to any device other than the user device that is capable of displaying or routing display of a virtual machine. For example, the terminal could be a smart television. Similarly, a "reader" is not limited to just NFC readers. Any type of reader or short-range transceiver is possible, and NFC readers are referred to as an example and for convenience. SAML tokens are also discussed for convenience. However, other types of tokens and certificates, such as OATH, can alternatively or additionally be used with the examples above.

Though some of the described methods have been presented as a series of steps, it should be appreciated that one or more steps can occur simultaneously, in an overlapping order. The order of steps presented is only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for displaying, at a user device, a virtual machine associated with a user of the user device, comprising:
   authenticating the user device at a management server using a token received from an identity manager;
   sending, from the management server to the user device, a profile and virtual machine information, the virtual machine information identifying the virtual machine with a unique identifier and the profile specifying a configuration for the virtual machine that limits functionality available through the virtual machine;
   providing the token and the virtual machine information to a virtual machine (VM) player executing on the user device; and
   displaying the virtual machine at the user device based on the profile and based on the VM player contacting a virtual machine server using the token and the virtual machine information.

2. The method of claim 1, further comprising placing the user device in proximity to a near-field-communication (NFC) reader.

3. The method of claim 1, further comprising providing a graphical user interface at the user device for selecting between a plurality of virtual machines to operate on the user device.

4. The method of claim 1, further comprising providing a graphical user interface at the user device for selecting between a plurality of virtual machines to operate at a terminal separate from the user device.

5. The method of claim 4, wherein the selection between the plurality of virtual machines is transmitted to the terminal.

6. The method of claim 4, further comprising displaying the virtual machine at the terminal based on a selection made at the graphical user interface of the user device.

7. The method of claim 1, wherein displaying the virtual machine comprises receiving graphics frames from the virtual machine server and displaying the graphics frames.

8. A non-transitory, computer-readable medium containing instructions executed by at least one hardware processor to perform stages for displaying, at a user device, a virtual machine associated with a user of the user device, the stages comprising:
   authenticating the user device at a management server using a token received from an identity manager;
   sending, from the management server to the user device, a profile and virtual machine information, the virtual machine information identifying the virtual machine with a unique identifier and the profile specifying a configuration for the virtual machine that limits functionality available through the virtual machine;
   providing the token and the virtual machine information to a virtual machine (VM) player executing on the user device; and
   displaying the virtual machine at the user device based on the profile and based on the VM player contacting a virtual machine server using the token and the virtual machine information.

9. The non-transitory, computer-readable medium of claim 8, the stages further comprising placing the user device in proximity to a near-field-communication (NFC) reader.

10. The non-transitory, computer-readable medium of claim 8, the stages further comprising providing a graphical user interface at the user device for selecting between a plurality of virtual machines to operate on the user device.

11. The non-transitory, computer-readable medium of claim 8, the stages further comprising providing a graphical user interface at the user device for selecting between a plurality of virtual machines to operate at a terminal separate from the user device.

12. The non-transitory, computer-readable medium of claim 11, wherein the selection between the plurality of virtual machines is transmitted to the terminal.

13. The non-transitory, computer-readable medium of claim 11, the stages further comprising displaying the virtual machine at the terminal based on a selection made at the graphical user interface of the user device.

14. The non-transitory, computer-readable medium of claim 8, wherein displaying the virtual machine comprises receiving graphics frames from the virtual machine server and displaying the graphics frames.

15. A system for displaying, at a user device, a virtual machine associated with a user of the user device, the system comprising:
   a non-transitory, computer-readable medium that contains instructions;
   a hardware processor that executes the instructions to perform stages including:
      authenticating the user device at a management server using a token received from an identity manager;
      sending, from the management server to the user device, a profile and virtual machine information, the virtual machine information identifying the virtual machine with a unique identifier and the profile specifying a configuration for the virtual machine that limits functionality available through the virtual machine;
      providing the token and the virtual machine information to a virtual machine (VM) player executing on the user device; and
      displaying the virtual machine at the user device based on the profile and based on the VM player contacting a virtual machine server using the token and the virtual machine information.

16. The system of claim 15, the stages further comprising placing the user device in proximity to a near-field-communication (NFC) reader.

17. The system of claim 15, the stages further comprising providing a graphical user interface at the user device for selecting between a plurality of virtual machines to operate on the user device.

18. The system of claim 15, the stages further comprising providing a graphical user interface at the user device for selecting between a plurality of virtual machines to operate at a terminal separate from the user device.

19. The system of claim 18, wherein the selection between the plurality of virtual machines is transmitted to the terminal.

20. The system of claim 18, the stages further comprising displaying the virtual machine at the terminal based on a selection made at the graphical user interface of the user device.

* * * * *